(12) United States Patent
Tregaskis et al.

(10) Patent No.: US 9,767,095 B2
(45) Date of Patent: Sep. 19, 2017

(54) APPARATUS, SYSTEM, AND METHOD FOR COMPUTER AIDED TRANSLATION

(75) Inventors: Richard Tregaskis, Orem, UT (US); Scott Wells, Vancouver (CA); Caden Clegg, Daejeon (KR)

(73) Assignee: Western Standard Publishing Company, Inc., Orem, UT (US)

( * ) Notice: Subject to any disclaimer, the term of this patent is extended or adjusted under 35 U.S.C. 154(b) by 288 days.

(21) Appl. No.: 13/113,862

(22) Filed: May 23, 2011

(65) Prior Publication Data
US 2012/0022852 A1 Jan. 26, 2012

Related U.S. Application Data

(60) Provisional application No. 61/347,291, filed on May 21, 2010.

(51) Int. Cl.
| G06F 17/28 | (2006.01) |
| G06F 17/20 | (2006.01) |
| G06F 17/27 | (2006.01) |
| G06F 3/00 | (2006.01) |
| G06F 17/30 | (2006.01) |
| H04N 7/00 | (2011.01) |

(52) U.S. Cl.
CPC .................. G06F 17/2836 (2013.01)

(58) Field of Classification Search
USPC ......... 704/2, 3, 4, 5, 8, 9, 10, 246; 715/236, 715/264, 703; 707/771; 348/468
See application file for complete search history.

(56) References Cited

U.S. PATENT DOCUMENTS

| 4,774,666 A | 9/1988 | Miyao et al. |
| 4,791,587 A | 12/1988 | Doi |
| 5,091,876 A | 2/1992 | Kumano et al. |
| 5,448,474 A | 9/1995 | Zamora |
| 5,486,111 A | 1/1996 | Watkins |
| 5,535,120 A | 7/1996 | Chong et al. |
| 5,644,686 A | 7/1997 | Hekmatpour |
| 5,675,815 A | 10/1997 | Yamauchi et al. |
| 5,724,593 A | 3/1998 | Hargrave, III et al. |
| 5,806,021 A | 9/1998 | Chen et al. |
| 5,867,811 A | 2/1999 | O'Donoghue |
| 5,978,754 A | 11/1999 | Kumano |
| 6,047,299 A * | 4/2000 | Kaijima .............. G06F 17/273 704/10 |

(Continued)

OTHER PUBLICATIONS

PCT/US2011/037601, International Search Report and Written Opinion, Feb. 9, 2012.

*Primary Examiner* — Neeraj Sharma
(74) *Attorney, Agent, or Firm* — Kunzler Law Group

(57) ABSTRACT

An apparatus for assisting a human translator includes a source text module, a translator workspace module, a parsing module, a selection module, and a glossary module. The source text module receives source text in a source language. The translator workspace module displays a translator workspace field that is editable by a user. The parsing module parses the source text received by the source text module into separate portions. The selection module selects a first portion (first selected portion) of the separate portions for translation. The glossary module displays a term for term translation of the first selected portion of source text in a target language.

16 Claims, 7 Drawing Sheets

(56) References Cited

U.S. PATENT DOCUMENTS

| | | | |
|---|---|---|---|
| 6,161,082 A | 12/2000 | Goldberg et al. | |
| 6,208,956 B1 | 3/2001 | Motoyama | |
| 6,658,627 B1* | 12/2003 | Gallup et al. | 715/236 |
| 6,760,695 B1* | 7/2004 | Kuno | G06F 17/271 704/2 |
| 6,778,950 B2 | 8/2004 | Gohari | |
| 6,839,669 B1* | 1/2005 | Gould | G10L 15/22 704/246 |
| 6,993,473 B2 | 1/2006 | Cartus | |
| 6,996,520 B2 | 2/2006 | Levin | |
| 7,027,975 B1* | 4/2006 | Pazandak | G10L 15/30 704/9 |
| 7,110,938 B1* | 9/2006 | Cheng et al. | 704/5 |
| 7,124,073 B2 | 10/2006 | Tokuda et al. | |
| 7,536,294 B1* | 5/2009 | Stanz et al. | 704/3 |
| 7,539,619 B1* | 5/2009 | Seligman | G06F 17/2755 704/2 |
| 7,657,521 B2* | 2/2010 | Masarie | G06F 17/278 704/10 |
| 7,983,895 B2* | 7/2011 | McEntee | G06F 9/4448 704/2 |
| 9,405,745 B2* | 8/2016 | Dendi | G06F 17/289 |
| 2001/0029455 A1 | 10/2001 | Chin et al. | |
| 2001/0037492 A1 | 11/2001 | Holzmann | |
| 2002/0161569 A1 | 10/2002 | Itoh et al. | |
| 2002/0165708 A1* | 11/2002 | Kumhyr | 704/8 |
| 2003/0004702 A1 | 1/2003 | Higinbotham | |
| 2003/0105621 A1 | 6/2003 | Mercier | |
| 2004/0030542 A1 | 2/2004 | Fuji | |
| 2004/0167768 A1* | 8/2004 | Travieso et al. | 704/2 |
| 2004/0243391 A1 | 12/2004 | Nelson et al. | |
| 2004/0243396 A1 | 12/2004 | Liu et al. | |
| 2004/0260532 A1* | 12/2004 | Richardson et al. | 704/2 |
| 2005/0010421 A1 | 1/2005 | Watanabe et al. | |
| 2005/0043949 A1 | 2/2005 | Roth et al. | |
| 2005/0149316 A1 | 7/2005 | Ushioda et al. | |
| 2005/0267734 A1 | 12/2005 | Masuyama | |
| 2005/0288920 A1 | 12/2005 | Green et al. | |
| 2006/0111896 A1 | 5/2006 | Menezes | |
| 2006/0136193 A1 | 6/2006 | Lux-Pogodalla et al. | |
| 2006/0136223 A1 | 6/2006 | Brun | |
| 2006/0217961 A1 | 9/2006 | Masuichi et al. | |
| 2006/0277029 A1* | 12/2006 | Green et al. | 704/4 |
| 2007/0203688 A1 | 8/2007 | Fuji et al. | |
| 2008/0021698 A1* | 1/2008 | Itoh et al. | 704/2 |
| 2008/0281578 A1* | 11/2008 | Kumaran | G06F 17/28 704/2 |
| 2009/0132234 A1* | 5/2009 | Weikel | G06F 17/2827 704/3 |
| 2009/0281789 A1* | 11/2009 | Waibel | G06F 17/2735 704/3 |
| 2009/0313005 A1* | 12/2009 | Jaquinta | G06F 17/289 704/2 |
| 2010/0082324 A1* | 4/2010 | Itagaki et al. | 704/2 |
| 2010/0118189 A1* | 5/2010 | Ayoub | G06F 17/289 348/468 |
| 2010/0145673 A1* | 6/2010 | Cancedda | G06F 17/289 704/3 |
| 2010/0223047 A1* | 9/2010 | Christ | 704/4 |
| 2011/0066421 A1* | 3/2011 | Lee | G06F 17/289 704/2 |
| 2011/0093254 A1* | 4/2011 | Kuhn | G06F 17/2827 704/2 |
| 2011/0125486 A1* | 5/2011 | Jaiswal | G06F 17/289 704/3 |
| 2011/0126098 A1* | 5/2011 | Jellison, Jr. | G06F 9/4448 715/703 |
| 2011/0252316 A1* | 10/2011 | Pahud et al. | 715/264 |

\* cited by examiner

300 → El conflicto de Botnia Aparece en primer plano en la agenda bilateral. El embajador en Montevideo, Hernan Patino Mayer, afirmo que las Presidenta "apuesta" a que mejoren las relaciones luego del trifuno del dirigente del Frente Amplio enel balotaje.

301 → El conflicto de Botnia Aparece en primer plano en la agenda bilateral.

303 → El embajador en Montevideo, Hernan Patino Mayer, afirmo que las Presidenta "apuesta" a que mejoren las relaciones luego del trifuno del dirigente del Frente Amplio enel balotaje.

FIG. 3A

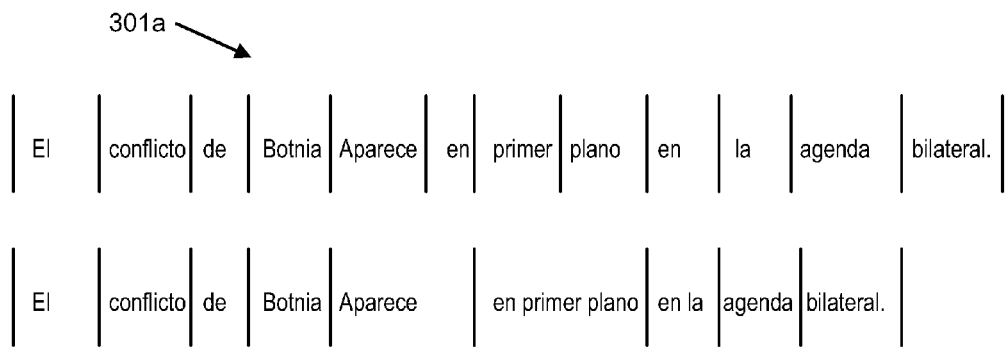

FIG. 3B

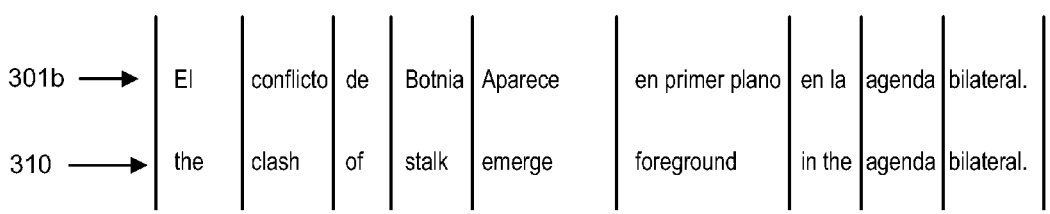

FIG. 4

APPARATUS, SYSTEM, AND METHOD FOR COMPUTER AIDED TRANSLATION

CROSS-REFERENCE TO RELATED APPLICATIONS

This application claims priority to U.S. Provisional Patent Application No. 61/347,291 entitled "Apparatus, System, and Method for Computer Aided Translation" and filed on 21 May 2010 for Richard Tregaskis et al, which is incorporated herein by reference for all that it contains.

BACKGROUND

Field of the Invention

This invention relates to translation apparatus, systems, and methods and more particularly relates to computer aided translation.

Description of the Related Art

Over the past few decades a great deal of time and money has gone into an effort which would allow computers to automatically translate text from one language to another (commonly referred to as machine translation or MT). These efforts have failed because computers do not have the capacity to do the abstraction required in the art of translation.

As developers came to understand the limitation of computers to engage in the Art of translation, their development efforts shifted to creating Computer Aided Translation (CAT) systems, primarily relying on Translation Memory (TM). TMs, when used in CAT systems, eliminate the retranslation of text segments that have already been translated. These systems simply compare source text to a body of previously translated text (corpora). Using various algorithms the computer generates percentage scores to indicate the similarity of the source text and previously translated segments in the corpora.

CAT systems that use TMs are exceptionally useful where the same sentence (segment) is encountered repeatedly. In such an environment, translation can occur very rapidly, in fact, automatically in rare cases where the similarity score is 100%. However, this methodology's primary weakness is that it does not engage in any meaningful analysis beyond simple comparison. Further, this methodology does not attempt to make any significant comparisons at a sub-sentence level. This is a substantial weakness in situations where the text varies greatly but the concept varies only slightly. For example, the sentences "The cat ate the tuna" and "The cat is eating the cheese," while very similar in concept would generate such a low similarity score that the previously translated text would likely not be presented to the translator.

Further, CAT systems that rely on TMs fail where source words do not change but context changes significantly. Consider the difference between "the China case came apart easily," and "the china case came apart easily." The word "case" may have two completely different meanings although words of the sentences are identical. For example, in the first sentence "case" may be referring to an argument regarding the country of China while "case" in the second sentence may be referring to a cabinet where dinnerware is stored. Thus, TM-based CAT methodology might automatically insert an inappropriate translation or mislead a translator.

BRIEF SUMMARY

From the foregoing discussion, it should be apparent that a need exists for an apparatus, system, and method for computer-assisted translation that better complements the translation ability of human translators. Beneficially, such an apparatus, system, and method would provide tools to assist a human translator in the translation process without taking over too much of the translation process.

The present invention has been developed in response to the present state of the art, and in particular, in response to the problems and needs in the art that have not yet been fully solved by currently available computer aided translation systems. Accordingly, the present invention has been developed to provide an apparatus, system, and method for assisting a human translator that overcome many or all of the above-discussed shortcomings in the art.

The apparatus to assist a human translator is provided with a plurality of modules configured to functionally execute the necessary steps of assisting the translator. These modules in the described embodiments include a source text module, a translator workspace module, a parsing module, a selection module, and a glossary module.

The apparatus, in one embodiment, is configured to receive source text in a source language. The apparatus displays a translator workspace field editable by a user. The apparatus parses the source text received by the source text module into separate portions. The apparatus select a first portion (first selected portion) of the separate portions for translation. The apparatus displays a term for term translation of the first selected portion of source text in a target language The apparatus is further configured, in one embodiment, to display the term for term translation in a term order of the source text. In one embodiment, the term for term translation includes a first term in the target language. The first term corresponds to a second term in the source language and is a translation of the second term. One or more of the first term and the second term comprise two or more words In one embodiment, the apparatus may be configured to parse the source text into one or more sentences and/or one or more terms. In one embodiment, the apparatus is configured to parse the source text into one or more terms based on terms found in one or more resources.

In one embodiment, the apparatus is configured to display a context field, the context field containing text providing context for the currently selected portion. In one embodiment, the apparatus is configured to display a source text field, the source text field displaying a portion of the source text. In one embodiment, the apparatus is configured to dynamically display information corresponding to the source text. In one embodiment, the apparatus is configured to select a second portion (second selected portion) of source text and wherein the resource module is configured to dynamically display information corresponding to the second selected portion.

In one embodiment, the apparatus is configured to display one or more fields, operations, and functions at substantially the same time on one or more displays. In one embodiment, the fields, operations, and functions provided by one or more of the source text module, the workspace module, the parsing module, the selection module, and the glossary module.

In one embodiment, the apparatus is configured to manage hierarchical resources, the hierarchical resources including a first resource and a second resource, the first resource having a higher priority than the second resource. In one embodiment, managing the hierarchical resources includes one or more of searching the hierarchical resources according to their priority and providing features allowing the editing of one or more of the hierarchical resources.

A system of the present invention is also presented to assist a human translator. The system, in one embodiment, includes one or more displays, one or more input devices, one or more resources, and a translation apparatus.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 3A-3B, and 4 are diagrams showing exemplary source text and exemplary parsing and term for term translations of the source text;

DETAILED DESCRIPTION

Figure 1:
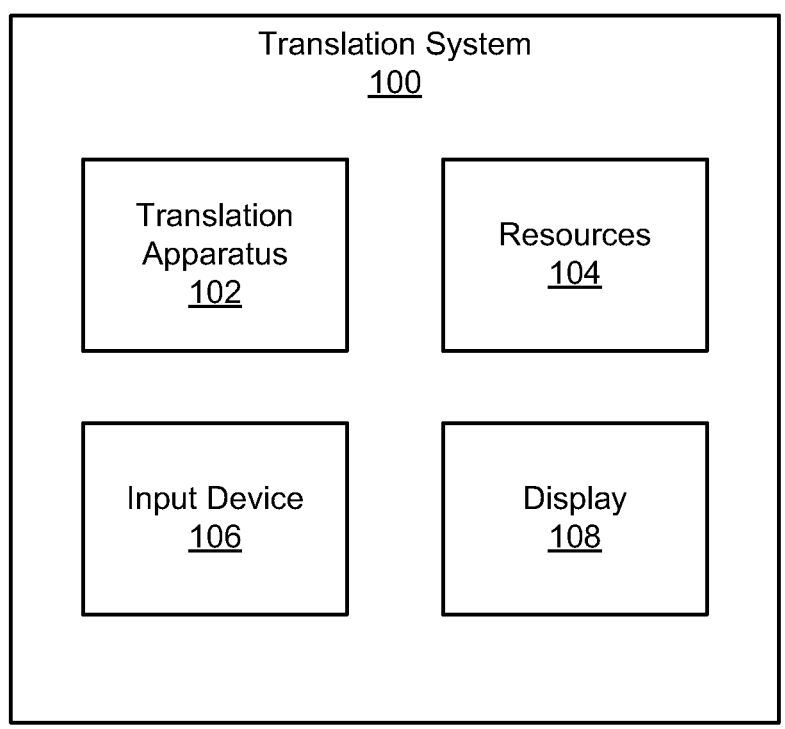
FIG. 1 is a schematic block diagram illustrating one embodiment of a translation system in accordance with the present invention.

Translating text from one language to another is more art than science. The art of translation is generally time-consuming, thought intensive, and very subjective in nature. Each translator should strive to not only understand the style and context of the source text, but also to keep a similar style and context in the target text. Thus, translating may be based on numerous nuances of the original text. These nuances may include the subject of the original text, the voice of the original text, the writing style of the original text, regional differences in language usage, how a previous sentence or term was translated, the context of a sentence, term or paragraph within the original text, and numerous other nuances.

Nuances regarding the properties desired in the translated version of the original text may also influence how the text is translated. For example, a desired writing style of the translated text, the target audience of the translated text, and the flow of language may all come into play during translation. Other special nuances may come into play based on the original language, the target language, and special issues with regard to translations between the specific languages. In addition to all of these nuances, translating can be an extremely subjective process and reasons for translating original text in different ways is often based on the "feel" of the original and translated text.

As discussed above, current translation methods and systems tend to attempt to offload as much of the translation process as possible into software, a computing device, or other methods. However, many of these methods and systems result in errors in translation and fail to account for various nuances of the original text and desired properties of the translated text. As such, these systems and methods tend to create faulty, inaccurate, or difficult to read translations if automatically translated by a machine or the systems and methods get in the way and even significantly hamper or slow a human translator in the translation process by leading them down the wrong path or distracting them from the best translation.

Translators are very good at understanding concepts and relating to them in context. Further, translators are experts at relating new concepts to common contexts, which are known to both the communicator and the communicatee. They are also adept at rewording concepts in the target language to meet the stylistic nuances of the source text. Despite tremendous resources and years of effort, computers still lack these skills that are so naturally human. On the other hand, computers have the ability to process, store, search and access vast amounts of data extremely rapidly.

The present disclosure discuses apparatus, systems, and methods for translating where a computing device may become a powerful tool in assisting a translator to find and quickly use appropriate terms and phrases as they encounter different concepts in the source text. This process may help maximize the strengths and minimize the weaknesses of both the translator and the computer, thereby creating significant gains in translator efficiency in terms of quality and quantity of work.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Turning now to FIG. 1, a schematic block diagram illustrating a translation system 100 in accordance with one embodiment of the present invention is shown. The translation system 100, according to the depicted embodiment, includes a translation apparatus 102, one or more resources 104, one or more input devices 106, and one or more output devices 108.

The translation system 100 is configured to assist a human translator in translating text from a source language into a target language. To assist a human translator, the translation system 100 may be configured to complement the abilities of the human translator. For example, operations or functions that are performed better by human translators may largely be left to be performed by the human translators, while operations or functions that are better performed by electronic devices may largely be left to the translation system 100 and/or translation apparatus 102. According to one embodiment, the translation system 100 may perform operations or functions that are performed more quickly and accurately by a computer or other electronic device. Such operations or functions may include looking up a definition in a resource 104 (such as a dictionary), performing repetitive functions, and/or managing large amounts of data. These are things at which electronic devices can often excel in comparison to a human.

However, the translation system 100 may also be configured to avoid performing operations or functions at which electronic devices may not excel. For example, human translators often significantly outperform computers at relating concepts to a current context, taking stylistic nuances of source and target languages into account, and providing fluid and readable material. Thus, according to some embodiments, a human translator is encouraged or compelled to provide the final translation of a given portion of text. Encouraging or compelling the translator to perform certain tasks or function may be accomplished by the design of the translation system 100 and/or translation apparatus 102. For example, a translator may be required to input the entire translation of a sentence.

The translation apparatus 102 provides a number of features and functions to assist a human translator to quickly and accurately produce a translation of a source text into a target language. For example, the translation apparatus 102 may provide features and functions that provide useful resources and information to a translator without getting in the translator's way or trying to do work at which the computer does not excel. According to one embodiment, these features and functions include providing a term for term translation of a portion of the source text while maintaining the term order of the source text. Providing a term for term translation, rather than a machine translation, enables a translator to quickly remember translations of terms without leading the translator down the wrong path. Keeping the translated terms in the original order forces a translator to think about how to rearrange and modify these words for the grammar of the target language.

According to one embodiment, the features and functions of the translation apparatus 102 include displaying a portion of a source text, and/or providing an editable workspace field for a translator to provide a translation. According to one embodiment, the translation apparatus 102 displays a portion of source text preceding a sentence that is currently being translated to provide context for the human translator. The translation apparatus 102 may provide information relating to words, terms, sentences, or any other portion of the source text by providing relevant portions of one or more resources 104. A variety of other features and functions may also be available in various embodiments. According to one embodiment, these features and functions are provided concurrently on a display, such as display 108. Further description of the features and functions of the translation apparatus 102 is provided in relation to later figures.

One or more resources 104 each include information relating to the source language, target language, or both. For example, the resources 104 may include source language dictionaries, target language dictionaries, target language to source language dictionaries, source language to target language dictionaries, machine translation tools, translation memory databases, links to collaboration websites, links to web searches, or any other resource that may be helpful in the translation of a text.

According to one embodiment, these resources 104 are accessible by the translation apparatus 102. According to one embodiment, one or more of the one or more resources 104 is automatically searched by the translation apparatus 102 for a term, word, or phrase found in the source text. For example, if a human translator selects a word or term by clicking on it using an input device 106, the translation apparatus 102 may automatically look up that word or term in one of the resources 104.

The input device 106 and the display 108 provide means for interaction of a human translator with the translation system 100. For example, the input device 106 may include one or more of a keyboard, mouse, trackball, stylus, microphone, or any other input device known in the art. The display 108 may include one or more screens displaying information and/or features provided by the translation system 100. Using the input device 106 and/or display 108 a human translator can view information and provide input such as text or instructions.

According to various embodiments, the components 102-108 of the translation system 100 may be part of a single device or multiple separate devices. According to varying embodiments, each component 102-108 may include one or more devices, files, or programs.

Figure 2:
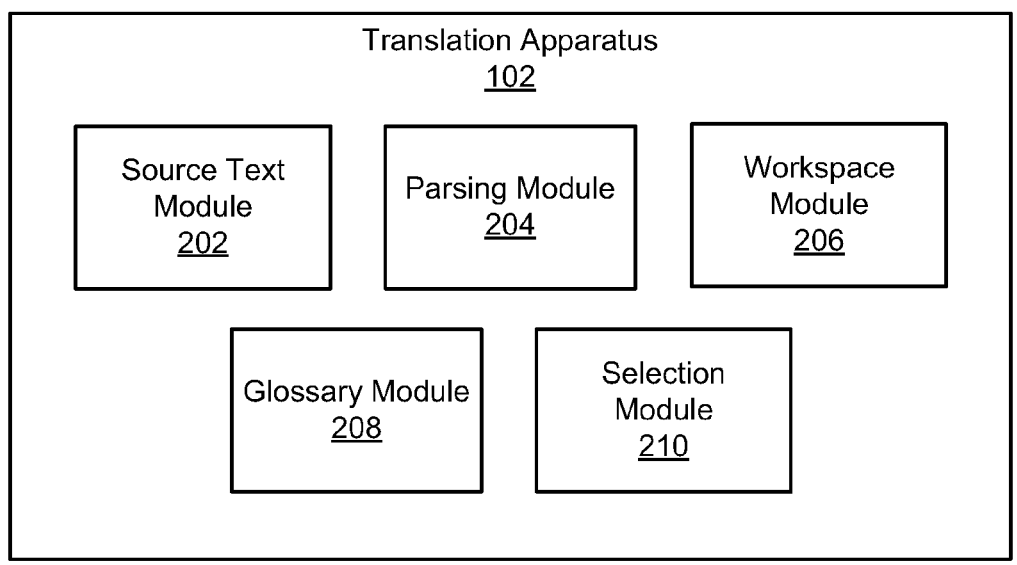
FIG. 2 is a schematic block diagram illustrating one embodiment of a translation apparatus in accordance with the present invention.

FIG. 2 is a schematic block diagram illustrating one embodiment of a translation apparatus 102. The translation apparatus 102, according to the depicted embodiment, includes a source text module 202, a parsing module 204, a workspace module 206, a glossary module 208, and a selection module 210.

The source text module 202 may receive and display a portion of source text. The source text may include text that is to be translated and is in a source language. The source text may be received by the source text module 202 in a variety of manners. For example, a source text module 202 may provide options to open a file containing source text, download source text over a network connection, or copy/paste source text into a source text field, or receive the source text in any other manner.

According to one embodiment, the source text module 202 allows a translator to open and import source text from a variety of file formats. Exemplary formats include, but are not limited to XML, HTML, TXT, RTF, PDF or any other formats for text known in the art. According to one embodiment, image files or image based PDFs may be imported and converted to a text format using optical character recognition (OCR) technology. The source text module 202 may receive the text resulting from such conversion of an image file using OCR technology.

According to one embodiment, the source text module 202 may display a source text field. The source text field may display a portion of source text. According to one embodiment, the source text field displays a portion of the source text that is currently being translated (selected portion). For example, the source text field may display a sentence that is currently being translated (selected sentence). According to one embodiment, the source text field displays a sentence or segment of text that is currently being translated. According to one embodiment, portions of the source text preceding or following a currently translated portion are also displayed. According to one embodiment, how information is displayed by the source text module 202 is influenced by how the source text is parsed by the parsing module 204. Information displayed by the source text module 202 may also be influenced by the dimensions of the source text field itself.

The parsing module 204 parses source text into different portions and/or terms. According to one embodiment, the parsing module 204 parses the source text into different sentences. This may be done, for example, by parsing the source text into different portions based on sentence ending punctuation. For example, the parsing module 204 may search for periods, exclamation marks, and questions marks at the end of sentences. The portions of text following a previous sentence ending punctuation mark and including the next sentence ending punctuation mark may be marked as a single sentence.

According to another embodiment, the parsing module 204 may parse the source text into other types of portions, such as sentence fragments. The parsing module 204 may obtain sentence fragments, for example, by parsing the source text into different portions based on sentence punctuation marks or other characters. For example, the parsing module 204 may search for sentence punctuation marks such as sentence ending punctuations as well as commas, colons, semicolons, hyphens, slashes, new line characters, paragraph characters, etc. The portions of text following a previous sentence punctuation mark or character and including the next sentence punctuation mark may be marked as a single sentence fragment.

According to one embodiment, the parsing module 204 may parse or sub-parse the source text into words or terms. For example, the parsing module 204 may parse a complete or substantial portion of source text into different words or terms. According to one embodiment, the parsing module 204 sub-parses only a sentence or other smaller portion of source text into different words or terms. For example, the parsing module 204 may search for sentence punctuation marks as well as spaces within a sentence or sentence fragment. The portions of text following a previous sentence punctuation mark or space and prior to the next sentence punctuation mark or space may be marked as a single word or term. A term may be more than one word, in some embodiments. For example, a single word in one language is not always accurately translated by a single word. Thus, it may be desirable to translate a single word of a source language using multiple words in a target language, translate multiple words of a source language using a single word in a target language, and/or translate multiple words of a source language using multiple words in a target language.

The parsing of the source text by the parsing module 204 may influence the way information is displayed by one or more modules 202-210 of the translation apparatus 102. For example, according to one embodiment, the source text module 202 will display the source text to reflect the way it has been parsed into sentences. According to one embodiment, alternating sentences may be displayed having alternating display characteristics. The display characteristics that are varied may include font characteristics such as font color, font size, bolding, underlining, italicizing, highlighting, etc. According to another embodiment, symbols may be inserted between sentences to set them apart. According to other embodiments only a single sentence, such as a sentence that is currently being translated (selected sentence), may be displayed differently than other source text at a time. According to one or more of these embodiments, a selected sentence may be displayed differently from the other source text. When the selected sentence is changed, that newly selected sentence may then be displayed differently from the rest of the source text.

Additionally, the word or term parsing may be reflected in the way information is displayed by the modules 202-210. For example, each term within a word may be displayed in a different color. According to other embodiments, the display characteristics may repeat every two, three, or more words/terms. Thus, a human translator may be able to easily and quickly determine how the parsing module 204 has parsed the source text in relation to sentences, terms, and/or words. According to one embodiment, the term for term parsing of the source text may be reflected in a source text field and/or in any other field.

According to varying embodiments, the parsing module 204 may parse all or only a portion of source text at a time. For example, many source texts are extremely large and it may be undesirable to parse the entire source text at a single time. In such cases, it may be desirable to parse portions of the source text as a translator works through the source text to translate it. For example, this may allow a translator to make a change to the parser or dictionary and quickly reparse a specific segment. According to other embodiments, it may be more desirable to parse the entire source text prior to beginning translation. For example, in some embodiments the parsing of the complete source text at a single time may allow for less delay during the translation process.

According to one embodiment, a full paragraph of source text may be parsed at a time. According to another embodiment, a fixed number of lines may be parsed at a time. For example, when a translator moves past a parsed portion, the parsing module 204 may then parse the next fixed number of lines. According to another embodiment, the parsing module 204 may wait to parse a portion of source text until that portion is being displayed by the source text module 202. According to one embodiment, the source text may be parsed before the source text is received by the source text module 202, for example by the translation apparatus 102 or a separate apparatus.

In some embodiments, a human translator may control how the source text is parsed. For example, the human translator may highlight a certain portion of source text and select an option to set that portion as its own parsed portion. Alternatively or additionally, the human translator may select sentences or portions that have already been parsed and combine or split the portions. For example, there may be a need to combine or split sentences in the source language to read correctly in the target language. The translator may also nee the system to recognize that the translator is working on a sub-sentence or multi-sentence level in the source language. Thus, the human translator may have significant control over how the source text is parsed and may be able to fix errors or other problems with automatic parsing.

According to one embodiment, the parsing module 204 may save the source text as it has been parsed. Thus, the parsing module 204 may not need to parse the same portion of source text more than once. This may allow a human translator to skip around in the source text without creating extra parsing workload for the parsing module 204.

The workspace module 206 may provide a workspace field where a translator may work to create a translation of the selected portion of source text. According to one embodiment, the workspace field is a text editable field where a translator can enter, delete, or edit text. According to one embodiment, the workspace module 206 may save information that is entered into the workspace field as corresponding to the currently selected portion of text. For example, if a specific source text sentence is currently selected, any text entered into the workspace field may be attributed as corresponding to that source text sentence. According to one embodiment, the workspace module 206 saves the information corresponding to one or more portions parsed by the parsing module 204. When the selected sentence changes to a different sentence, the workspace field may be updated with text correspond to the newly selected sentence. If no text has been entered in relation to the newly selected sentence, for example, the workspace field may be blank.

According to one embodiment, the workspace module 206 may save additional information related to the saved workspace text. For example, a workspace module 206 may provide an option to mark the target text corresponding to a specific source sentence as finished or unfinished. This may allow a translator to perform some work on translating a source text segment and then return to it later if the translation has not yet been finalized.

The saved target text may be saved in a variety of output formats. According to varying embodiments, the target text may be saved in an HTML, XML, TXT, RFT, or any other type of format. According to one embodiment, the saved target text may be saved in a file separate from the source text. According to another embodiment, the saved target text and source text may be saved within a single document. In one embodiment, source text is saved in a first column of a file, for example a column in a XML or RTF file, and the corresponding target text is saved in a second column in the same file. For example, the source language text may be saved in a column on a left side of a page while corresponding target language text may be saved in a column on a right side of a page.

Saving files in columns within the same file may allow for simplicity in tracking source and target text. Saving files within columns of the same file may also allow for useful formatting for those reading or viewing the document. For example, a reader may be able to easily tell which portion of a target text corresponds to a specific portion of a source text. This may provide considerable utility for reviewing a translation or reading a transcript of an interview.

According to one embodiment, when a portion of target text is not marked as final it may only be saved in a document saving changes made in the workspace. For example, this may include an output document or a workspace document. According to one embodiment, when a portion of target text is marked as final the target text may be saved to one or more locations. For example, the target text may be saved to an output document, a translation memory database. In one embodiment, the final target text may be saved with the corresponding source text in the translation memory database. This may allow a user to access the saved translation later on while translating the same document or may allow other users to access the information. For example, a manual search may also be performed at any time through a concordance search interface of a subsection of any given segment. In this manner, one or more resources may be updated modified, and/or improved as more and more translation takes place.

The workspace module may include a number of error checking features. These features may include spell checking, grammar checking, and/or a punctuation verifier. The punctuation verifier may compare punctuation, such as sentence ending punctuation, to punctuation in the original text. For example, the punctuation verifier may compare the sentence ending punctuation for a target sentence to sentence ending punctuation for a source sentence. The punctuation verifier may display an error indicator or message if there is a question mark in the source sentence but a period in the target sentence, for example.

The glossary module 208 may display a glossary field showing a term for term translation of at least a portion of the source text into a target language. The term for term translation may maintain the term order of the source text. According to one embodiment, the glossary field may show only the translation of the currently selected sentence or portion. According to one embodiment, the glossary module 208 may display a term for term translation based on parsing performed by the parsing module 204 or another apparatus.

According to one embodiment, the glossary module 208 may display the target language terms to show to which term of the source text they correspond. For example, if a term is displayed in the source text field in a certain font style or color, the glossary module 208 may display the corresponding target language term with the same font style and color. Thus, a human translator can quickly discern which term in the glossary field corresponds to which term in the source text field. Such a feature may be especially helpful when multi-word terms are used. For example, if the source text term is one word and the corresponding target text term is two words, the color codes may help a translator understand that the two words of the target text term correspond to the one word of the source text term.

According to one embodiment, a user may be able to override the parsing of a word or group of words as a term and/or the corresponding translation of that term. For example, a user may be able to select a word or group of words that has been parsed as a term and enter a new word or group of words as a translation for the term. According to another embodiment, a user may be able to delete the translation of the term so that the specific word or group of words is not parsed in the same manner. The changes that a user makes may be saved to one or more resources so that the terms will be correctly parsed and/or translated in the future. According to one embodiment, the changes/additions are saved to one or more resources that are used by all users of a translation system or apparatus. According to another embodiment, the changes/additions are saved to a resource that applies to a subset of the users of a translation system or apparatus. For example, the changes or additions may be saved to a dictionary specific to a current user of the system or apparatus.

The displaying of a term for term translation of a source text sentence in a target language may provide significant benefit when performing the translation. In some embodiments, this has proved to significantly improve translation speed and quality. The term for term translation provides a quick and easy way to bring translations of terms to the mind of a translator and may act as an immediate reference. At the same time, however, the term for term translation is generally a sufficiently incomplete translation of the source sentence that it does not lead the translator down the wrong path of thought. The human translator may still be required to provide a target language sentence that embodies the proper grammar as well as the subtle nuances, uses, and characteristics of the source language sentence. Thus, the translation apparatus 102 may benefit the translator by doing what an electronic apparatus can do best but leaving what humans do best to a human translator without getting in the way.

The selection module 210 may manage which portion and/or term of source text is currently selected. According to one embodiment, a portion of text may be selected when the functions and features of the translation apparatus 102 are directed towards that portion. For example, when a sentence is selected, the glossary module 208 may display a term for term translation of the sentence and any information entered into the workspace field may be saved as corresponding to that sentence. When a term is selected, the translation apparatus 102 may supply information corresponding to that term. According to some embodiments, by selecting a small portion of source text at a time, the translation process is made more efficient and simple, enabling a human translator to focus on creating excellent translations of sentences.

According to one embodiment, the selection module 210 provides functions and features allowing a human translator to control what portion is selected by the selection module 210 and the translation apparatus 102. For example, the selection module 210 may display options or features on the display 108 that are selectable by a human translator using an input device 106. These options, in one or more embodiments, may include one or more of a next sentence, previous sentence, next unfinished sentence, and a previous unfinished sentence option. The unfinished sentences options may use the data saved by the workspace module 206 to determine which sentence or portion of source text is unfinished and requires additional work. Using these options the translator may be able to select which sentence the translator wishes to work on at that point.

According to one embodiment, the selection module 210 may allow a translator to change the selection by selecting different portions of display text with an input device, such as a mouse or stylus. For example, the translator may click on or highlight a portion of text in the source text field or glossary field. The selection module 210 may then change its selection to the sentence and/or term that is selected or clicked on or within.

The selection module 210 may control how a selected portion of text is displayed. For example, if a sentence or term is selected, the font style or other properties of the selected text may be displayed differently from non-selected text. For example, a selected sentence may be highlighted underlined, colored, or shaded in a different manner from non-selected text. According to one embodiment, a selected sentence is displayed with different font or other attributes than a selected term. For example, a selected sentence may be highlighted in yellow while a selected term may be bolded, underlined or highlighted in a different color. According to one embodiment, the display of the selected text in the source text field may reflect the term for term parsing by the parsing module 204. The change in display attributes may be reflected in one or more fields displayed by the translation apparatus 102. For example, the source text field provided by the source text module 202 and/or the glossary field provided by the glossary module 208 may reflect the selection of the selection module 210. Other fields may be affected in the same or alternative embodiments.

FIGS. 3A-3B and 4 illustrate exemplary parsing by the parsing module 204 and term for term translation by the glossary module 208. FIG. 3A illustrates an exemplary portion of source text 300 to be translated. According to the depicted embodiment of FIGS. 3A-3B and 4 the source language is Spanish and the target language is English. According to one embodiment, the source text 300 may be received by the source text module 202. After the source text 300 has been received, it may be parsed by the parsing module 204 into a first sentence 301 and a second sentence 303.

FIG. 3B illustrates two alternate results of parsing the first sentence 301 into terms. The vertical lines shown illustrate the parsing of the sentence. Parsed sentence 301a may be the result of parsing the first sentence 301 into separate words by the parsing module 204, according to one embodiment. According to one embodiment, parsing module 204 may designate each word as its own term by finding spaces, hyphens, slashes, or other sentence punctuations.

According to another embodiment, parsed sentence 301b may be the result of parsing the first sentence 301 into separate terms by the parsing module 204. According to one embodiment, the parsing module 204 finds terms in the first sentence 301 that are found in one of the resources 104, such as a dictionary. For example, the parsing module 204 may have found the Spanish term "en primer plano" in a Spanish/English dictionary or other resource and thus parsed the three words as a single term. The only other multi-word term found in sentence 301, in the depicted embodiment, was "en la." The other words were not found to form any other multi-word terms available in a resource, according to the depicted embodiment, so they were left as single word terms.

According to one embodiment, the parsing module 204 may locate multi-word terms by taking the first four words of the sentence and searching one or more resources 104 for that term. If the term is found in one of the one or more resources 104, such as if a dictionary contains a multi-word term and its translation, the parsing module 204 may designate those four words as a term. If the first four words are not found in a resource, the parsing module 204 may then take the first three words and search for that term. If that term is found, then the first three words may be designated as a term. If not, this process may repeat until it proceeds down to the case where there is only one word. In that case the parsing module 204 then may automatically designate that single word as its own term. This process may repeat starting with the portion of the sentence that has not yet been designated as part of any term. For example, if the first four words were found to be a term, the process would repeat taking the next four words, starting with the fifth word, and searching for those terms.

As will be understood in light of the present disclosure by one of skill in the art, the maximum term size used above is only exemplary. The parsing module 204 may use any maximum term size such as, such as five words, two words, or other term sizes. According to one embodiment, the term size may be adjusted by a user, such as a human translator.

According to one embodiment, only certain types of resources 104 may be used by the parsing module 204 to parse terms. For example, some embodiments may only use dictionaries while other embodiments may use any subset of the resources 104 as mentioned above.

FIG. 4 shows an exemplary term for term translation 310 of the first sentence 301 that may be provided by the glossary module 208. According to one embodiment, the glossary module 208 displays a term for term translation 310 that includes a translation of each term of the first sentence 301 as parsed 301b by the parsing module 204. According to one embodiment, the glossary module 208 maintains the terms in the same term order as the source text 300.

According to one embodiment, the glossary module 208 may take the first term of a sentence and displays a corresponding word or term in the target language and repeats this process until it has displayed a translation for each term. For example, according to the depicted embodiment, glossary module 208 displayed the English word "the" as a translation of "El", "clash" for "conflicto" and all the way through the segmented first sentence 301b.

As previously mentioned, the translation apparatus 102 may display corresponding terms with similar attributes to help a translator understand that the word term "clash" corresponds to "conflicto" and that the term "foreground" corresponds to the term "en primer plano." For example, the source text module 202 may display each term of the first sentence 301 with a different color and the glossary module 208 may color each term of the term for term translation 310 to match the corresponding term in the first sentence 301. According to one embodiment, the color-coding of the terms of a sentence may only be done when that sentence is the selected sentence.

Figure 5:
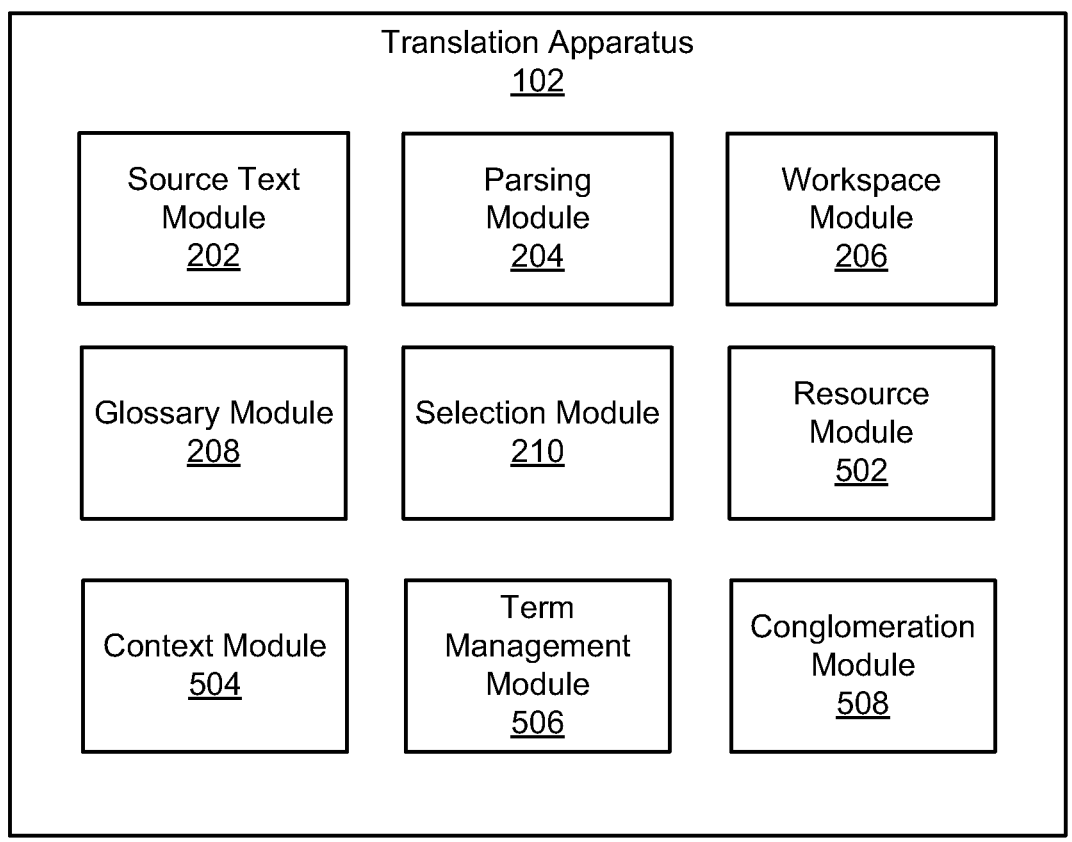
FIG. 5 is a schematic block diagram illustrating another embodiment of a translation apparatus in accordance with the present invention.

Turning now to FIG. 5, a translation apparatus 102 that includes additional modules is shown. The translation apparatus 102 of FIG. 5 is shown having all the modules 202-210 of FIG. 2 but also additional modules 502-508. The additional modules include a resource module 502, a context module 504, a term management module 506 and a conglomeration module 508. Although all modules are shown combined into a single translation apparatus 102, this is exemplary only as varying embodiments may have any combination of one or more of the modules 202-210 and 502-508 shown.

The resource module 502 may include functions and features that look up and display information from resources, such as resources 104, that corresponds to currently selected text. According to one embodiment, the resource module 502 displays a resource field including information corresponding to one of a currently selected sentence, a currently selected term, or both. The information displayed may be information from a variety of resources 104 such as source language dictionaries, target language dictionaries, target language to source language dictionaries, source language to target language dictionaries, machine translation tools, translation memories, collaboration websites, web searches, or any other resource that may be helpful in the translation of a text.

According to one embodiment, the resource module 502 may allow for a concordance search. As used herein, a concordance search is a custom search of one or more databases and/or resources. For example, a user may initiate a search of any of the one or more resources 104. For example, a user may initiate a search of a translation memory database of one or more selected or entered words. The use may then be able to find matches that may not otherwise pop up in automatic searches. In this manner, a user may also be able to search translation memories for matches other than complete sentence or portion matches. Sub-portions or segments of sentence may also be returned.

According to one embodiment, the resource module 502 allows a user, such as a human translator, to select which resource is currently being used. For example, the resource module 502 may provide tabs, buttons, multiple choice boxes, list boxes, etc. to allow a human translator to choose between the various resources 104. According to one embodiment, the resource module 502 displays information from the selected resource that corresponds to the selected text.

The context module 504 may display information to provide context for the currently selected text. According to one embodiment, the context module 504 displays one or more previous source text sentences or target text sentences. According to another embodiment, the context module 504 displays one or more subsequent source text sentences or target text sentences. This additional information may help a translator to remember and keep in mind the context of a sentence to be translated. This may allow the translator to provide more accurate translations of source text sentences. Remembering context is often very important in translation as the same word in different contexts can often point towards very different words, terms, or usage in a translated language.

The term management module 506 may manage one or more resources, such as one or more dictionaries, or a combination of resources. For example, the term management module 506 may act as a gateway for reading data from and writing data to one or more resources. According to one embodiment, when one of the other modules of the translation apparatus 102 needs to access one of the resources 104, they send data to the term management module 506 which then sends the data to or searches one or more of the resources. For example, if the parsing module 204 or the glossary module 208 needs to look up a term, they may send the term to the term management module 506 which then searches a resource for the term.

According to one embodiment, the term management module 506 searches the resources according to a priority. According to one embodiment, the resources 104 include one or more dictionaries each having a different priority. For example, the resources may include a general Spanish to English to dictionary as well as a translator specific Spanish to English dictionary specific to a human translator with the translator specific dictionary having a higher priority. The term management module 506 may search for a term first in the translator specific dictionary. If the term was not found in the translator specific dictionary the term management module 506 may then search one of the lower priority dictionaries.

The term management module 506 may also provide features and functions for users to edit one of the one or more resources. According to one embodiment, the resources 104 include a translator specific Spanish to English dictionary and the term management module 506 provides a function to add or edit terms in the dictionary. The translator may provide a new source term and its corresponding term in a different language for addition to the translator specific dictionary. The term management module 506 may allow a specific user to edit all resources or only edit certain resources. For example, it may be desirable that a general dictionary not be editable by just any user or else there may be a danger of incorrect or bad edits.

According to one embodiment, the term management module 506 manages two or more hierarchical dictionaries. For example, the hierarchical dictionaries may include a user-specific dictionary having a highest priority, one or more context specific dictionaries having a next highest priority, and a general language dictionary having a lowest priority. According to one embodiment, the user specific dictionary may only be available to a single user. To ensure that it is known who is using the translation apparatus 102 the translation apparatus 102 may require login credentials to access certain features. The context specific dictionary may include information that is generally applicable to only certain subject matter. For example, there may be a context specific dictionary for medical terms, engineering terms, artistic terms, financial terms, business terms, etc. There may also be context specific dictionaries for different locales or dialects.

According to one embodiment, the term management module 506 mines terms from existing resources. For example, the term management module 506 may mine terminology from translation memories. Translation memories generally correspond a sentence in a first language with a sentence in a second language. However, translation memories generally do not correspond specific words or sub-phrases within the two sentences. According to one embodiment, the term management module 506 may look up a word or term of interest, such as a word or term that has been parsed by a parsing module 204, or a word or term that has been selected or entered by a user. The term management module 506 may find the word or term of interest in a first sentence in a first language. The first sentence in the first language may correspond to a second sentence in a second language. The term management module 506 may then attempt to find a word or term in the second sentence that corresponds to the word or term of interest.

The conglomeration module 508 may combine the displays, features and functions provided by one or more of the modules 202-210 and 502-508 for display at substantially the same time. For example, the conglomeration module 508 may display the above-mentioned fields, functions, and options within a single window in a graphical user environment (GUI) or in two or more separate windows or panes. According to one embodiment, one or more of the features may be docked in a single or in separate windows. For example, in one embodiment all of the features and fields are displayed in a single window but the fields may be undocked from the single window to form two or more windows. This may be helpful in a variety of situations and provides flexibility to the display layout. For example, if an individual is using a computer with two or more displays screens different fields and features may be undocked to be displayed in a different display screen. This may allow the increase of sizes of the fields, etc.

Displaying many fields, features, and/or options at the same time may provide significant assistance to a translator. For example, rather than toggling between separate programs or windows, or turning to references not provided by a translation system 100, the process of translation may be significantly expedited. A user may be able to simply glance at different portions of a display 108 to see virtually all desired relevant data for the task of translation.

Figure 6:
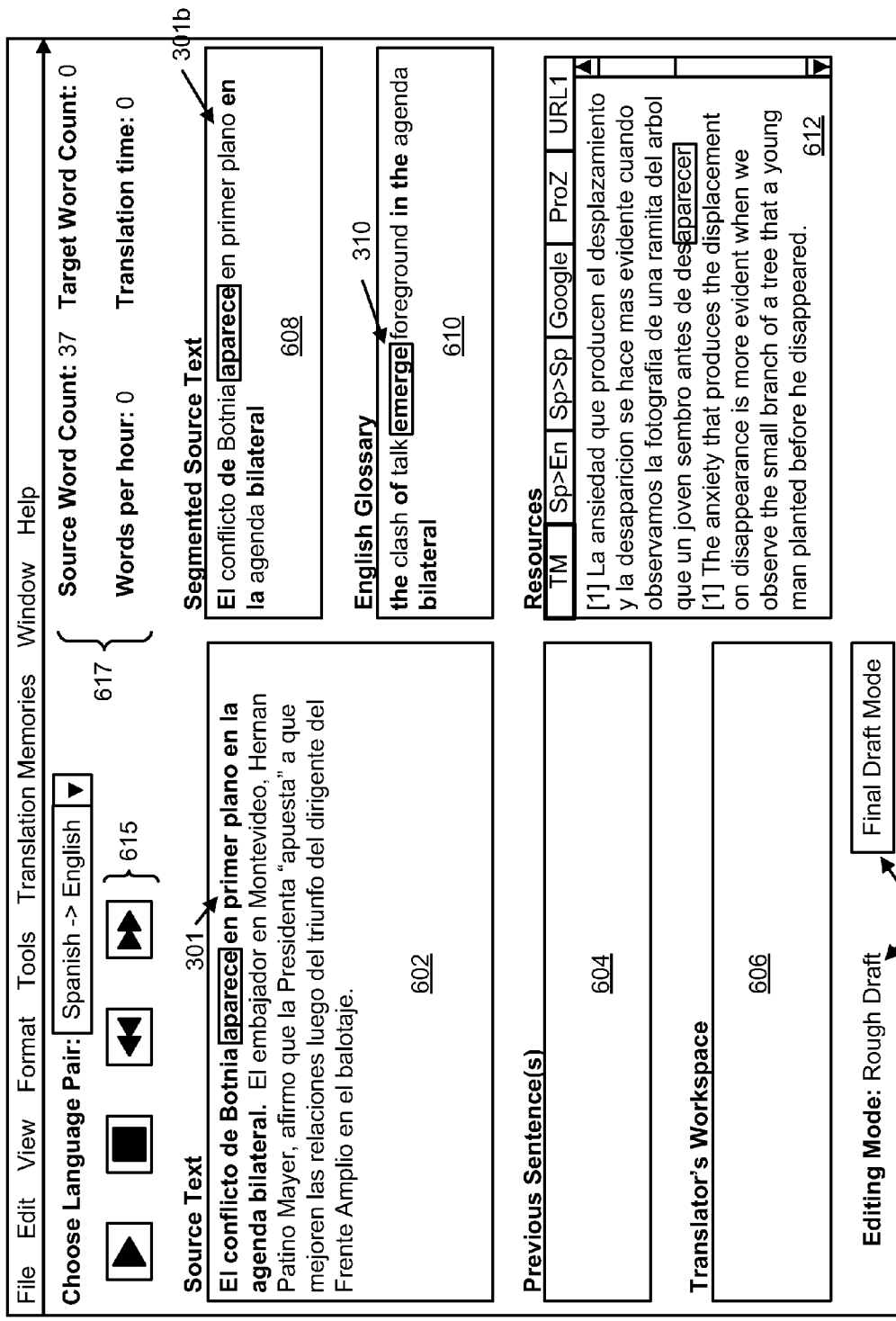
FIG. 6 is a screenshot of an exemplary display layout provided one embodiment of a translation apparatus in accordance with the present invention.

FIG. 6 is a screenshot illustrating one embodiment of a display layout 600 provided by the translation apparatus 102. The display layout 600 may be provided on a display 108 or on one or more of any display screen known in the art. According to one embodiment, the display layout 600 is provided in a GUI environment such as any GUI environments provided by operating or software systems known in the art. According to another embodiment, the display layout 600 is provided by a translation apparatus 102 that has an operating system specifically designed for embodying the present invention.

The display layout 600 includes a number of fields, buttons, features, and options. The fields, according to the depicted embodiment, include a source text field 602 which may be provided by the source text module 202, a previous sentence(s) field 604 which may be provided by the context module 504, a workspace field 606 which may be provided by the workspace module 206, a segmented source text field 608 which may be provided by the parsing module 204, a glossary field 610 which may be provided by the glossary module 208, and a resources field 612 which may be provided by a resource module 502.

The screenshot of the display layout 600 shows the translation apparatus 102 after the source text 300 of FIG. 3A has been received by the source text module 202 and at least partially parsed by the parsing module 204. According to the depicted embodiment, the source text 300 is displayed in the source text field 602. The first sentence 301 of the source text 300 is shown with a display feature (here in bold) than the rest of the source text 300 because it is the currently selected sentence.

The first sentence 301 is the currently selected sentence and the fields 602-612 display information related to the first sentence 301. For example, the previous sentence(s) field 604 does not display any text because there may be no source text prior to the first sentence 301.

The workspace field 606 displays information that has been entered in connection with the first sentence 301, which is nothing at the time of display of the display layout 600 in the depicted embodiment. According to one embodiment, the workspace field is text editable by a user. According to another embodiment, shortcuts for bringing in information or text in another field, such as the source text field 602, the previous sentences field 604, the segment source text field 608, the glossary field 610, and the resources field 612, may be provided. For example, a user may be able to bring text from another field by highlighting, copying, and pasting text from another field to the workspace field 606. Alternatively or additionally a user may be able to bring text from another field by double clicking on a word or by selecting an option to bring in text in another field.

The segmented source text field 608 displays the parsed sentence 301b while varying the display attributes of each term to illustrate how it has been parsed. In other embodiments, a segmented source text field 608 may not be present and the display attributes of each term may be varied in the source text field 602. The glossary field 610 displays the term for term translation 310 of the parsed sentence 301b while varying the display attributes of each term to illustrate how it has been parsed. The display attributes of a translated term of the term for term translation 310 are the same as the display attributes of the corresponding term of the parsed sentence 301b. In the depicted embodiment, corresponding terms are illustrated in an alternating bold non-bold pattern.

The resources field 612 displays information from a resource that corresponds to the word in the first sentence 301.

According to one embodiment, the translation apparatus 102 allow selection of two separate portions of text simultaneously. For example, the selection module 210 may select the first sentence 301 and a term within the second sentence 303. Thus, a term for term translation 310 of the first sentence 301 may be displayed in the glossary field 610 while at substantially the same time the resources field 612 displays information corresponding to a word or term in the second sentence 303.

As illustrated by the depicted embodiment, the resources field 612 may display information corresponding to a word, term, or selection within the currently selected sentence. A user may be able to control what is displayed in the resources field by clicking on a word within a sentence or highlighting a word, term or phrase by using a mouse or other input device. According to one embodiment, as soon as a user makes the selection, the resources field 612 is updated to reflect the new term, word, or phrase. In the depicted embodiment, the user has highlighted the word "aparece" within the first sentence 301 and the resources field 612 is showing information about that word. The segmented source text field 608, glossary field 610, and resource field 612 are also shown with the selected word highlighted. One embodiment allows selection of term that includes one or more words. The term may then be highlighted in one or more of the other fields.

The resource field 612 also offers a number of tabs 613 that allow a user to select what resource is being used. According to the depicted embodiment, a translation memory (TM) resource tab has been selected and the resource field 612 is showing information about translation memories that have the word "aparece" or words corresponding to "aparece" in them. A number of other tabs are also depicted including a Spanish to English tab (Sp>En), a Spanish to Spanish tab (Sp>Sp) providing Spanish definitions of Spanish words, a Google® tab (Google) for performing web searches, a ProZ tab (ProZ) for accessing or searching the ProZ.com® website, and a custom tab (My URL1). A user may be able to click on a different tab to look up information corresponding to a word, term or phrase in a different resource. According to one embodiment, each of the tabs 613 may be modified or removed or additional ones may be created. The depicted tabs/resources are exemplary only and one of skill in the art in light of the present disclosure will understand that numerous other tabs/resources may be used without departing from the scope and content of the present invention.

The display layout 600 also includes a variety of other options. Similar to windows in many computing systems, the display layout 600 has a menu bar where a user can access various options. The display layout 600 also includes a variety of translation progression options 615 which include a play button, a stop button, a forward button, and a backward button. According to one embodiment, the play button can be pressed to begin translation. When translation has begun the various fields 602-612 may then be active for the translation process. For example, a user may only be able to enter text into the workspace field 606 after translation has begun. The stop button may be used to stop translation and deactivate the fields 602 or other options.

The forward and backward buttons may be used to change what portion of text is selected by selection module 210, the translation apparatus 102, or the other modules 202-208 and 502-508, and fields 602-612. According to one embodiment, selecting the forward button will select the next sentence and choosing the backward button will select the previous sentence.

The display layout 600 also includes information fields 617 which may provide information about the current translation session or translation project. Shown are a source word count, words per hour, target word count, and translation time. The information fields 617 may be useful for keeping track of translation statistics, determining payment of a translator, creating reports, or other uses.

Additional features or options may also be available in one or more embodiments. For example, audio play back features may be included for transcribing or translating recorded audio. These play back features may include speed, rewinding, fast forwarding, stopping or other transcribing features known in the art.

According to one embodiment, one or more portions of the display layout 600 may be partially opaque in some embodiments. According to one embodiment, a portion of the display layout 600 is completely opaque or partially opaque to allow a document behind the display layout 600 to be visible. For example, a translator may be able to see a document to be translated through an opaque portion of the display layout 600.

Mode buttons 619 are also provided in the display layout 600. The mode buttons 619 may be useful to place the translation apparatus 102 and/or display layout 600 in a variety of modes. According to the depicted embodiment, the display layout 600 is in a "Rough Draft" mode. The Rough Draft mode provides numerous amounts of tools, functions, and research to assist a translator in creating a translation from scratch. In the depicted embodiment, the Rough Draft mode includes the depicted fields and functions.

The display layout 600 also offers a "Final Draft Mode." According to one embodiment, the Final Draft Mode places the display layout 600 in a mode where only the source text and the corresponding target text are shown. This may be useful for a translator, among other things, to quickly scan through the resulting translation to look for errors and/or analyze the overall feel of the translation. According to one embodiment, the source text and target text are shown side by side and a user is allowed to scroll through the texts. According to one embodiment, if a user scrolls through the source text the target text also scrolls with it, or vice versa, to keep corresponding target or source text in view.

In the embodiment of FIG. 6, the fields and features are all displayed as part of a single window. As mentioned above, one or more embodiments may include an option to undock one or more fields or features to allow an individual to rearrange or customize the display layout and/or move fields or features to a second display screen.

Figure 7:
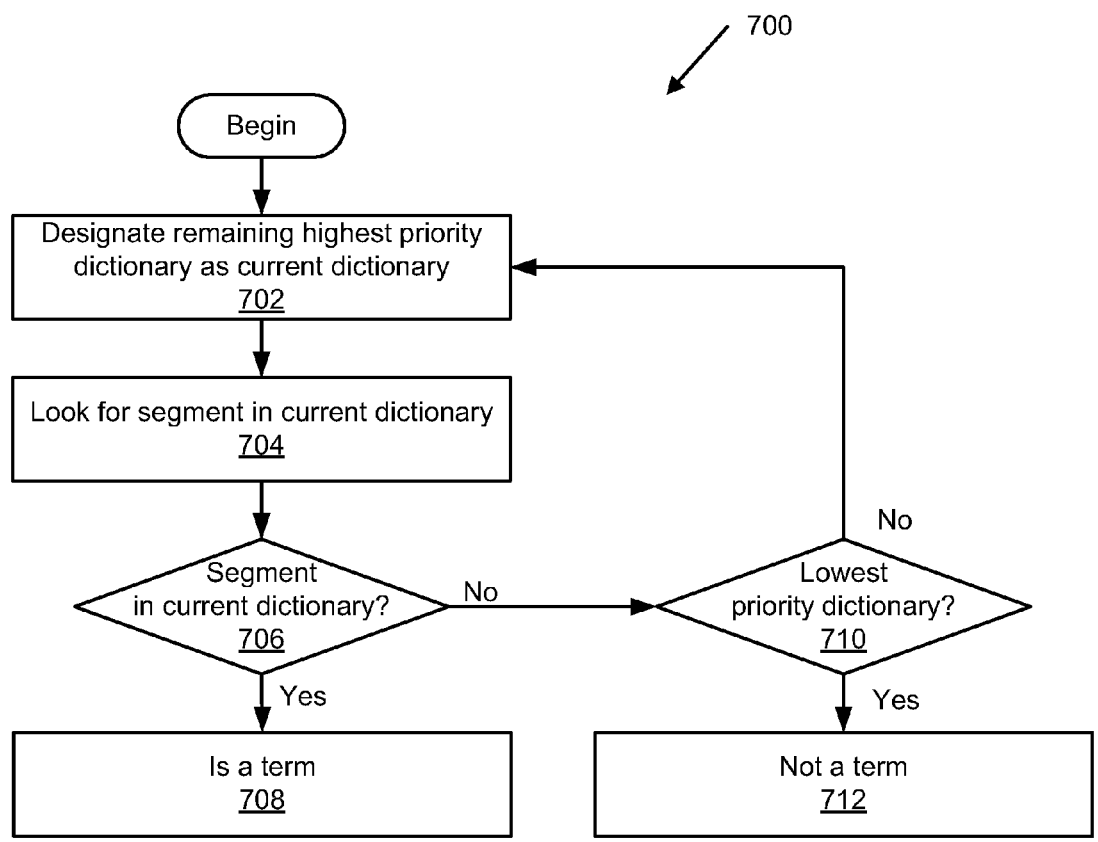
FIG. 7 is a schematic flow chart diagram illustrating one embodiment of a method for determining whether a segment of text is a term, in accordance with the present invention.

Turning to FIG. 7 a method 700 for determining if a segment of text constitutes a term is shown. According to one embodiment, the segment of text may comprise one or more words. The depicted method 700 uses two or more hierarchical dictionaries to determine if a segment of text is a term. For example, the method 700 searches the hierarchical dictionaries in order of priority to determine if the word is found in the dictionaries. According to one embodiment, the hierarchal dictionaries may comprise only source language to target language dictionaries. According to another embodiment, the hierarchical dictionaries may comprise any type of dictionary or resource, such as those discussed or disclosed herein. For example, two or more resources, not necessarily of the same type, may be ranked in a hierarchical manner.

The method 700 may begin in a variety of manners. According to one embodiment, the method 700 begins when a segment of text is received by the term management module 506. The term management module 506 may then use that segment as it performs the method 700.

When the method begins the highest priority dictionary remaining is designated 702 as the current dictionary. When the method first beings, for example, this step will designate 702 the highest priority dictionary as the current dictionary. Later in the method, however, this step may designate 702 lower priority dictionaries as the current dictionary.

The method 700 looks 704 for the segment in the current dictionary. If the segment is found 706 in the current dictionary, it is decided 708 that the segment is a term. If the segment is not found 706 in the current dictionary it is checked whether the current dictionary is the lowest priority dictionary 710. If the current dictionary is the lowest priority dictionary 710 it is decided 708 that the segment is a term. Otherwise, the method 700 starts over by designating 702 the remaining highest priority dictionary as the current dictionary.

When decisions 708, 712 are reached the method 700 may then end, according to some embodiments. According to some embodiments upon completion of the method 700 the term management module 506 may return information resulting from the method. For example, the term management module 506 may return information communicating that the segment was or was not a term. The term management module 506 may also, if it was decided 708 that the segment was a term, return the corresponding translation of that term.

The method 700 may be used in a variety of situations. According to one embodiment, the method 700 is used during parsing to determine whether a segment of text should be parsed as a term. According to one embodiment, the method 700 is issued to provide translations of terms for display in a glossary field. According to one embodiment, the method 700 may be performed by the term management module 506 on behalf of the parsing module 204 or the glossary module 208. According to one embodiment, the parsing module 204 and/or the glossary module 208 may perform the method 700.

Figure 8:
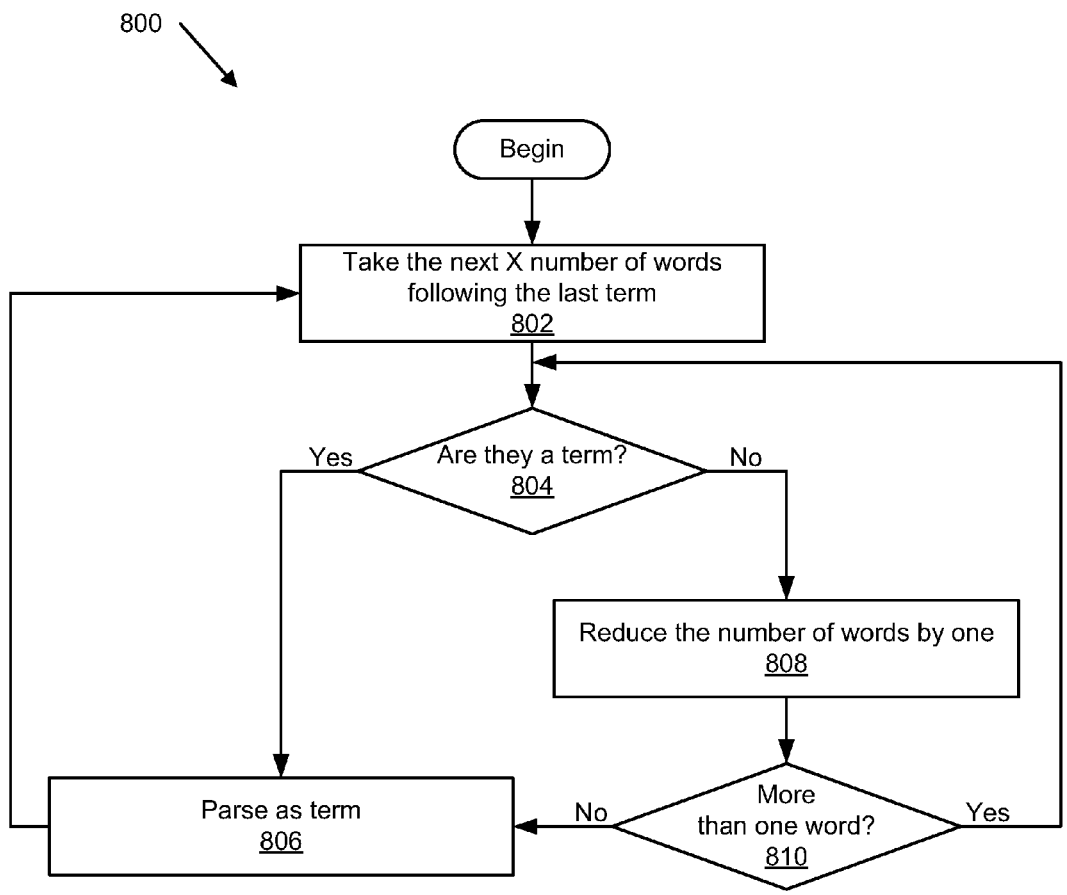
FIG. 8 is a schematic flow chart diagram illustrating one embodiment of a method for parsing source text, in accordance with the present invention.

Turning now to FIG. 8 a method 800 for parsing is shown. The method 800, according to one embodiment, may be performed by the parsing module 204. The method 800 may be performed on source text, such as a sentence or other portion of source text.

The method 800 begins and the parsing module 204 takes 802 the next X number of words of source text. The next X number of words may be a constant such as four or any other number. X may be a set value determined by the parsing module 204 or may be a value that can be adjusted or selected by a user. These words, are then checked 804 to see if they are a term. They may be checked 804, for example, by using the method 700 of FIG. 7 or another method. If the words are a term 804, the parsing module 204 parses 806 the number of words as a term. The method 800 may then repeat for the next X number of words.

If the words are not a term 804, then the number of words is reduced 808 by one. For example, if the number of words was four, the number of words would be reduced 808 to three. If the number of words after reduced 808 is more than one word, the method 800 may return to step 804 to determine if the next three words are a term. If the number of words after being reduced 808 is one 810, the one word would be parsed 806 as a term. The method may then repeat.

According to one embodiment, the method 800 may repeat until a portion of source text has been completely parsed into terms. According to another embodiment, the method 800 only continues until the end of a sentence.

Following the claims is an Appendix describing one exemplary embodiment of the present invention. As will be understood in light of the present disclosure by one of skill in the art, the embodiment, motivations, and benefits described therein are only exemplary.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising a computing device and at least one program module that are together configured for performing the actions comprising:
receiving a source text to be translated, the source text in a source language;
parsing the source text into separate portions;
displaying on a graphical user environment ("GUE"), in response to the parsing, the separate portions in a translator workspace field, the translator workspace field editable by a human translator;
selecting a portion of the separate portions for translation in response to a selection by the human translator, wherein the selection by the human translator results in changes to the GUE;
displaying the selected portion;
receiving a translation for the selected portion;
displaying a term for term translation of the selected portion in a target language, the selected portion, and the translation for the selected portion in the translator workspace field, wherein the term for term translation in the target language is displayed in a term order of the source text, a first term in the source text comprises a first format different from a second format of a second term in the source text, the first and second terms being adjacent to one another, a third term in the target language comprising the first format, the third term being the translation for the first term, and a fourth term in the target language comprising the second format, the fourth term being the translation for the second term, the first and second format comprise one or more of highlighted text, non-highlighted text, bolded text, non-bolded text, underlined text, non-underlined text, and text color, the human translator selectively applies the second format to the second term in the source text, and the second format is applied to the fourth term in response to the human translator selectively applying the second format to the second term; and
enabling the human translator to override the translation for the selected portion by updating the translation for the selected portion with changes via the translator workspace field and displaying the updates on the GUE.

2. The system of claim 1, wherein the term for term translation comprises a first term in the target language, the first term corresponding to a second term in the source language, wherein the first term is a translation of the second term, and wherein one or more of the first term and the second term comprise two or more words.

3. The system of claim 1, the actions further comprising further parsing the source text into one or more of:
   one or more sentences; or
   one or more terms.

4. The system of claim 1, the actions further comprising further parsing the source text into one or more terms based on terms found in one or more resources.

5. The system of claim 1, the actions further comprising displaying a context field configured for providing context for the selected portion.

6. The system of claim 1, the actions further comprising displaying a source text field, the source text field displaying the selected portion.

7. The system of claim 1, the actions further comprising dynamically displaying information corresponding to the source text.

8. The system of claim 7, the actions further comprising dynamically displaying information corresponding to the selected portion.

9. The system of claim 1, the actions further comprising displays one or more fields, operations, and functions at substantially the same time on one or more displays.

10. The system of claim 1, the actions further comprising managing hierarchical resources, the hierarchical resources comprising at least a first resource and a second resource, the first resource having a higher priority than the second resource.

11. The system of claim 10, wherein the managing the hierarchical resources comprises one or more of searching the hierarchical resources according to their priority or providing features allowing the editing of one or more of the hierarchical resources.

12. A computer storage device storing computer-executable instructions that, when executed by a computing device, cause the computing device to perform actions comprising:
   receiving a source text in a source language;
   parsing the source text into separate portions;
   displaying on a graphical user environment ("GUE") of the computing device, in response to the parsing, the separate portions in a translator workspace field, the translator workspace field editable by a human translator;
   selecting a portion of the separate portions in response to receiving a selection from the human translator indicative of one of the separate portions, wherein the selection from the human translator results in changes to the GUE;
   displaying a translation of the selected portion in a target language, a term for term translation of the selected portion in the target language, and the selected portion in the translator workspace field, wherein the term for term translation in the target language is displayed in a term order of the source text, a first term in the source text comprises a first format different from a second format of a second term in the source text, the first and second terms being adjacent to one another, a third term in the target language comprising the first format, the third term being the translation for the first term, and a fourth term in the target language comprising the second format, the fourth term being the translation for the second term, the first and second format comprise one or more of highlighted text, non-highlighted text, bolded text, non-bolded text, underlined text, non-underlined text, and text color, the human translator selectively applies the second format to the second term in the source text, and the second format is applied to the fourth term in response to the human translator selectively applying the second format to the second term; and
   enabling the human translator to override the translation for the selected portion by updating the translation for the selected portion with changes via the translator workspace field and displaying the updates on the GUE.

13. The computer storage device of claim 12, wherein the term for term translation comprises a first term in the target language, the first term corresponding to a second term in the source language, wherein the first term is a translation of the second term, and wherein one or more of the first term and the second term comprise two or more words.

14. The computer storage device of claim 12, wherein the parsing comprises parsing the source text into one or more terms based on terms found in one or more resources.

15. A method performed on at least one computing device, the method comprising:
   receiving a source text in a source language;
   parsing the source text into separate portions;
   displaying on a graphical user environment ("GUE"), in response to the parsing, the separate portions in a translator workspace field, the translator workspace field editable by a the human translator;
   selecting a portion of the separate portions in response to receiving a selection from the human translator indicative of one of the separate portions, wherein the selection from the human translator results in changes to the GUE;
   displaying a translation of the selected portion in a target language, a term for term translation of the selected portion in the target language, and the selected portion in the translator workspace field, wherein the term for term translation in the target language is displayed in a term order of the source text, a first term in the source text comprises a first format different from a second format of a second term in the source text, the first and second terms being adjacent to one another, a third term in the target language comprising the first format, the third term being the translation for the first term, and a fourth term in the target language comprising the second format, the fourth term being the translation for the second term, the first and second format comprise one or more of highlighted text, non-highlighted text, bolded text, non-bolded text, underlined text, non-underlined text, and text color, the human translator selectively applies the second format to the second term in the source text, and the second format is applied to the fourth term in response to the human translator selectively applying the second format to the second term; and
   enabling the human translator to override the translation for the selected portion by updating the translation for the selected portion with changes via the translator workspace field and displaying the updates on the GUE.

16. The method of claim 15, wherein the term for term translation comprises a first term in the target language, the first term corresponding to a second term in the source language, the first term being a translation of the second term, wherein one or more of the first term and the second term comprise two or more words.

* * * * *